United States Patent [19]
Horton

[11] Patent Number: 5,819,869
[45] Date of Patent: Oct. 13, 1998

[54] PAGER ACTUATED AUTOMOBILE DISABLING SYSTEM AND METHOD FOR USING SAME

[76] Inventor: Timothy D. Horton, 3106 Mace Ave., Unit B, Costa Mesa, Calif. 92626

[21] Appl. No.: 682,228

[22] Filed: Jul. 25, 1996

[51] Int. Cl.[6] .................................................. B60R 25/00
[52] U.S. Cl. ........................................................ 180/287
[58] Field of Search ............................................ 180/287

[56] References Cited

U.S. PATENT DOCUMENTS

| | | | |
|---|---|---|---|
| 4,997,053 | 3/1991 | Drori et al. | 180/287 |
| 5,132,551 | 7/1992 | Carlo et al. | 180/287 |
| 5,224,567 | 7/1993 | Tomlinson | 180/287 |
| 5,370,201 | 12/1994 | Inubushi | 180/287 |
| 5,448,218 | 9/1995 | Espinosa | 180/287 |

Primary Examiner—Kenneth R. Rice

[57] ABSTRACT

A method and apparatus are disclosed in which a pocket pager or other data transmission device of conventional design is used to disable the starting sequence of a motor vehicle. More precisely, the radio device is connected to pull open a latching relay in the ignition key circuit, and once the pager receives its code all further vehicle restarts are disabled. The vehicle thus remains operational until shut off, and the relay then remains latched open until reset by a concealed push-to-close momentary switch. Alternatively, a second code combination may be transmitted to reset vehicle operation. In application, the signal to the pager will first be preceded by a telephone call from the vehicle leasing, financing or rental agency to a telephone number designated by the vehicle user, and if the response to this phone call is unsatisfactory only then is the pager disabling sequence effected. In this manner the user is first warned, and then the vehicle is disabled only when first shut off.

12 Claims, 3 Drawing Sheets

PAGER ACTUATED AUTOMOBILE DISABLING SYSTEM AND METHOD FOR USING SAME

BACKGROUND OF THE INVENTION

1. Field of the Invention

The present invention relates to automobile security systems, and more particularly to remotely activated disabling systems for prevention of the continued unauthorised use of a motor vehicle.

2. Description of the Prior Art

The rising incidence of motor vehicle theft has resulted in various theft prevention devices which in one way or another increase the risk and thus reduce the efficacy of the theft. Most frequently the mechanism of theft detection is the mechanism of choice, and various alarm systems have been devised in the past which detect unauthorised intrusion and use. Along with the evolution of alarm systems a parallel development has been directed at mechanisms that disable the vehicle upon the detection of theft. These, for example, include various concealed fuel shut-off devices that disable the vehicle after a period of unauthorised use, and/or ignition disabling mechanisms that disrupt vehicle operation. In each instance, however, the vehicle is disabled more or less automatically, and the possibility of a stranded vehicle in the center of a thoroughfare is an ancillary concern of all such disabling devices.

Theft of a vehicle, however, is not the sole focus of concern. Rental agencies, leasing agencies, and sometimes the financing enterprise each have a direct interest in vehicle use, particularly when the various term provisions of the leasing, financing, or rental agreement have expired. In these circumstances the harsh consequences of automatic vehicle shut-down, and the consequent risks to the occupants and to others, are not desired, and some means for attenuation of the shut-down sequence are sought.

This attenuated method is particularly significant in settings that do not amount to an emergency. Unlike the exigency associated with vehicle theft, vehicle shut-down for contractual reasons does not represent sufficient cause for any risk enhancement. The preference, therefore, is to acquire control over the vehicle through judicial process, or by reposession, and not by methods justifying the risks associated with crime. Thus while the prior art is replete with systems and devices that become effective following a carjacking or vehicle theft, these techniques are not correct in a civil setting.

In the past the incidence of criminal taking has been the principal focus of attention in the art. Thus various interrogation and response techniques have been devised in systems directed to automatically control the criminal use of a vehicle. Examples of such prior art systems may be found in U.S. Pat. No. 5,370,201 issued on Dec. 6, 1994 to Inubushi; U.S. Pat. No. 3,646,515 issued on Feb. 29, 1972 to Vodehnal; U.S. Pat. No. 5,224,567 issued on July 6, 1993 to Tomlinson; U.S. Pat. No. 5,293,527 issued on Mar. 8, 1994 to Sutton et al; U.S. Pat. No. 5,382,948 issued on Jan. 17, 1995 to Richmond; U.S. Pat. No. 5,287,006 issued on Feb. 15, 1994 to Carlo et al; and others. Each of the foregoing, while suitable for the purposes intended, either requires two way communication with the vehicle, or is rendered operative in an automatic mode. In both instances the vehicle is simply disabled at whatever location and operating mode that is then effected. The attenuated shut-down, necessary for safe vehicle disablement in a civl setting, is not attended in the foregoing prior art and it is one such technique accomodating this particular objective that is disclosed herein.

SUMMARY OF THE INVENTION

Accordingly, it is the general purpose and object of the present invention to provide a remotely actuated vehicle disabling system conformed to prevent the next vehicle starting sequence following the receipt of a predetermined signal.

Other objects of the invention are to provide a pager actuated circuit interrupting system for preventing the restart of a motor vehicle following receipt of a predetermined code by the pager.

Yet further objects of the invention are to provide a mechanism for remotely preventing the starting sequence in a motor vehicle.

Briefly, these and other objects are accomplished within the present invention by way of a pager circuit connected to pull open a latching relay in the starting signal of a motor vehicle. Thus once pulled open no further starting signal is available for the next starting attempt. Since a vehicle is normally parked away from the thoroughfare traffic, this signal disruption presents the lowest risks to the occupant.

In the first example the page indicator outputs of the pager are connected to a power supply of sufficient power level to excite the solenoid of a latching relay connected in the starting signal circuit of a conventional motor vehicle. In the second example the page indicator outputs are tied directly across the relay solenoid, the selection of the first or second example being determined by the power levels of the pager and the power requirements of the relay coil.

In either form the correct signal sequence selecting the pager provides the signaling mechanism, and once the pager is selected by the transmitted signal code the relay is latched. No further starting sequence can thereafter be effected until the relay is unlatched. By concealing the unlatching function, the driver is then compelled to contact the rental or leasing enterprise, thus forcing the desired discourse.

In practice, the leasing, rental, or financing entity would first communicate with the operator of the vehicle by conventional telephonic means, and only after such a warning would the disabling signal be issued. The signaled party would thus be apprised of both the imminency of the subsequent step, and its implementation.

While the above primary functions are thus effectively achieved, the same mechanisms may be used following vehicle theft or car jacking. In this manner the well developed attributes obtainable in commercial pagers are useful in a system that discourages rental or leasing excesses, and also provides an emergency response if the vehicle is stolen.

This same arrangement may be implemented with a flip-flop toggle, whereby the second pager phonecall resets the operation of the device. Thus either access to a concealed switch or a second enabling phone call to the pager reset the operation of the system.

BRIEF DESCRIPTION OF THE DRAWINGS

FIG. 3 is yet another diagrammatic illustration of a second example of the invention herein;

DESCRIPTION OF THE PREFERRED EMBODIMENTS

Figure 1:
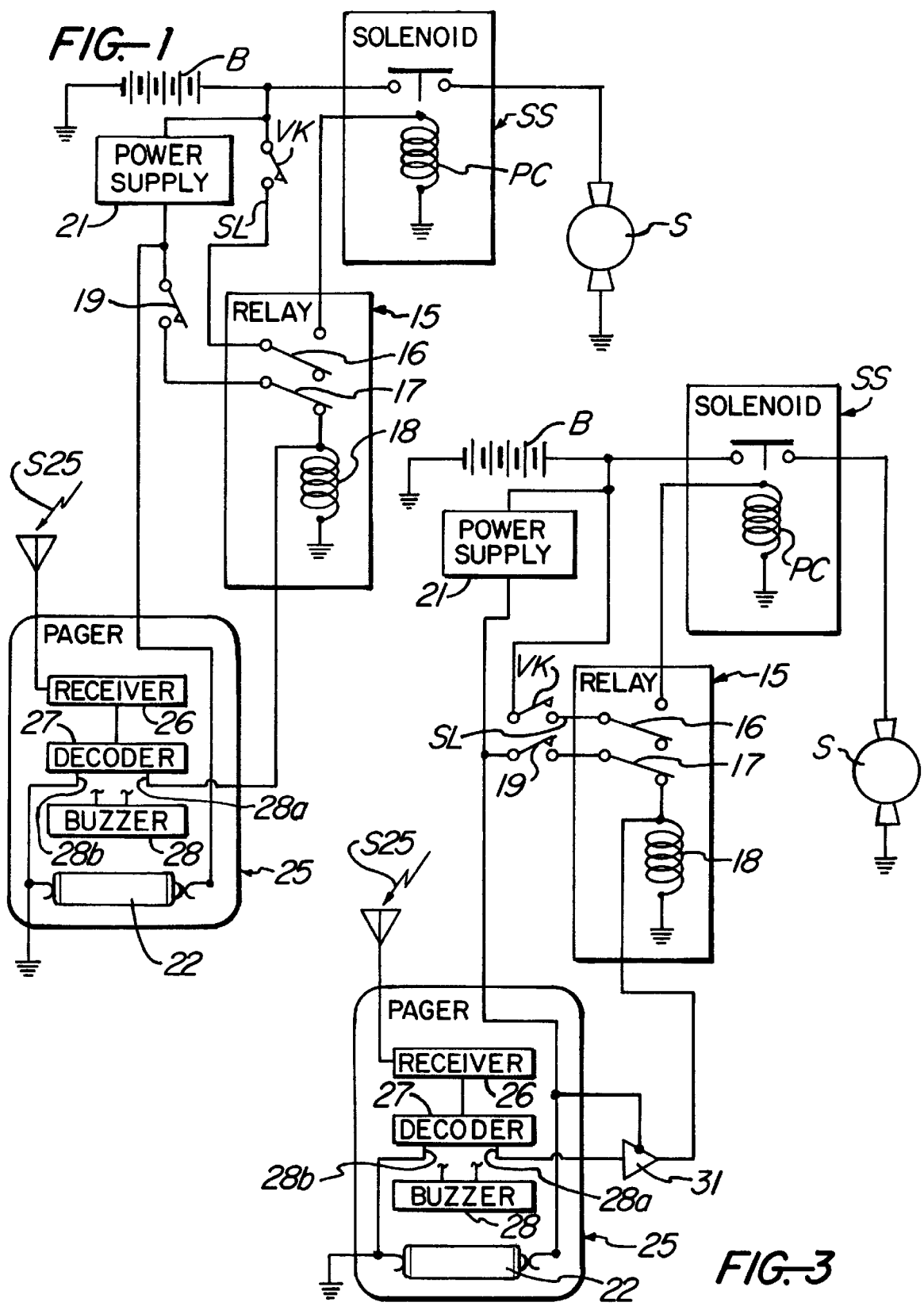
FIG. 1 is a diagrammatic illustration of the first example of the invention herein.
Figure 2:
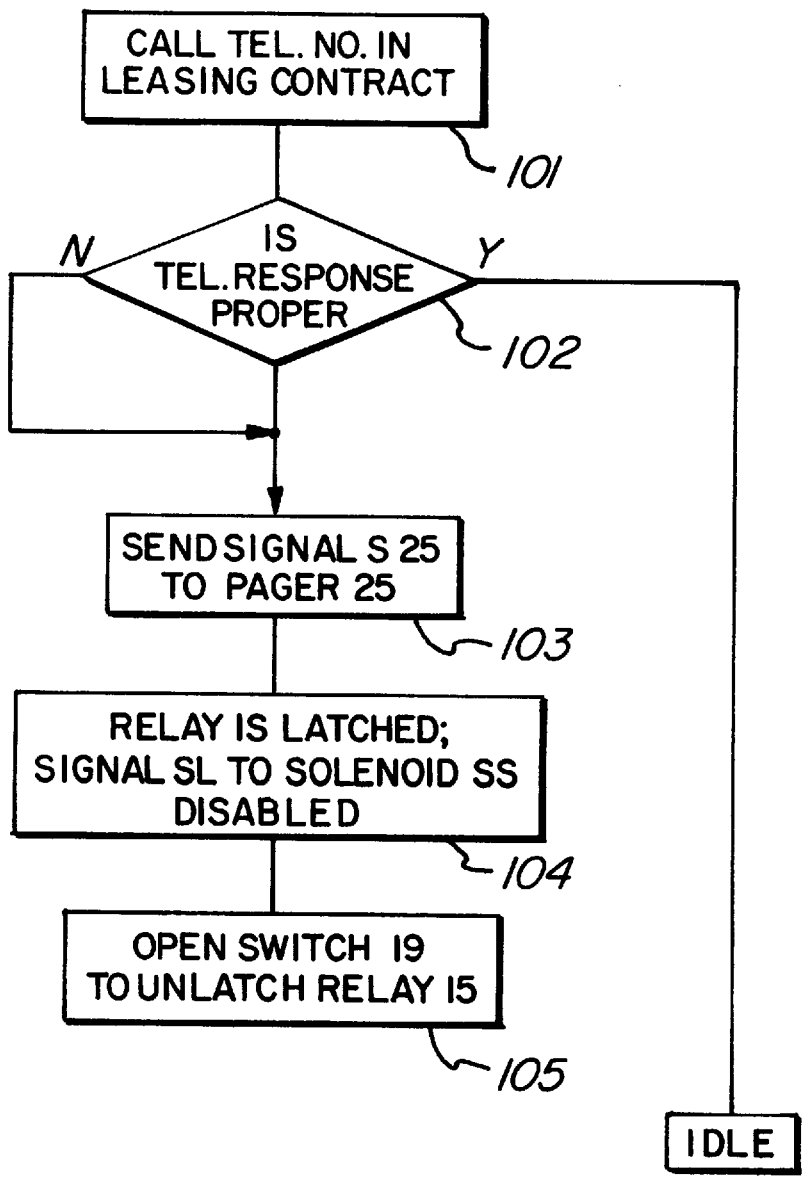
FIG. 2 is a process diagram illustrating the steps effected in the course of use of the invention herein.

As shown in FIGS. 1–3 the inventive vehicle disabling system, generally designated by the numeral 10, is rendered operative in conjunction with a conventional starter solenoid SS of a motor vehicle. In common practice solenoid SS connects between the vehicle battery B and the starter S in response to a pull-in coil PC excited by the start position of the vehicle key VK. Thus a starting signal lead SL is available for modification directly at the solenoid SS, and it is this lead that is utilised in the invention herein.

More precisely, a latching relay 15 is connected into the signal lead SL forming a bridging connection across the primary contacts 16. A secondary set of contacts 17 is operated in parallel by the relay coil 18 to latch the relay open by a secondary circuit from battery B that includes a concealed switch 19. The other side of switch 19 is then connected to the power supply 21 conformed to replace the batteries 22 of a pocket pager 25.

Pager 25 may be one of several commercial pagers characterised by a receiver with an antenna 26, a decoder circuit 27, and a buzzer or other signaling mechanism 28. Pagers of this form are widely accepted as a notification device to alert the user of incoming calls to his or her office and may include additional features like a numerical display (not shown), and memory (not shown), which in the use herein are not required. By conventional practice buzzer 28 is an electromechanical device, and thus entails current draws through coils or vibrators at levels comparable to those necessary for the excitation of a relay coil. These attributes are utilised to advantage herein by opening the circuit connection 28a and 28b to the buzzer 28 and reconnecting same across the coil 18. In this manner the signal acquisition by the pager 25 excites the coil to open the switching connection across terminals 16 and to close the latching connections 17, latching the relay. This then opens the lead SL, disabling all further starting attempts until the concealed switch 19, maintaining the latched state, is opened.

The signal transmission to pager 25 is typically at microwave frequencies, with various error detection codes imbedded in the signal. As result a very positive signal combination is used to communicate with the pager limiting the incidence of erroneous signals. Even at these low error rates the event count of intended disabling signals may be further reduced by a sequence of steps illustrated in FIG. 2. More specifically, prior to issuing the pager signal S25 the rental or leasing establishment first issues a telephone call to the telephone number listed in the agreement, shown as step 101, and if a proper response is obtained, shown as the branching step 102, then no further action is taken. If, however, no response is obtained, or the response is improper then the next step in the sequence branches to step 103 directing the signal transmission of the pager signal S25. The inventive disabling system 10 then automatically sequences to step 104, opening the signal lead SL to prevent all future attempts at starting the vehicle. This state subsists until step 105 in which the concealed switch 19 is opened, unlatching relay 15.

In the foregoing example a pager 25 having sufficient power to pull in relay 15 is illustrated. For those commercial pager structures lacking the necessary power reference should be made to the structure illustrated in FIG. 3 in which like numbered parts function in the manner previously described. In this illustration the buzzer leads 28a and 28b are connected to a driver 31 operating at the power levels available from battery B. The driver then provides the primary signal to coil 18, with the secondary signal path across switch 19 made directly to battery B. In this form all the signal paths exterior of the pager are at the battery levels of the vehicle, limiting all incidents of unintentional shorting or cross-connection.

Figure 4:
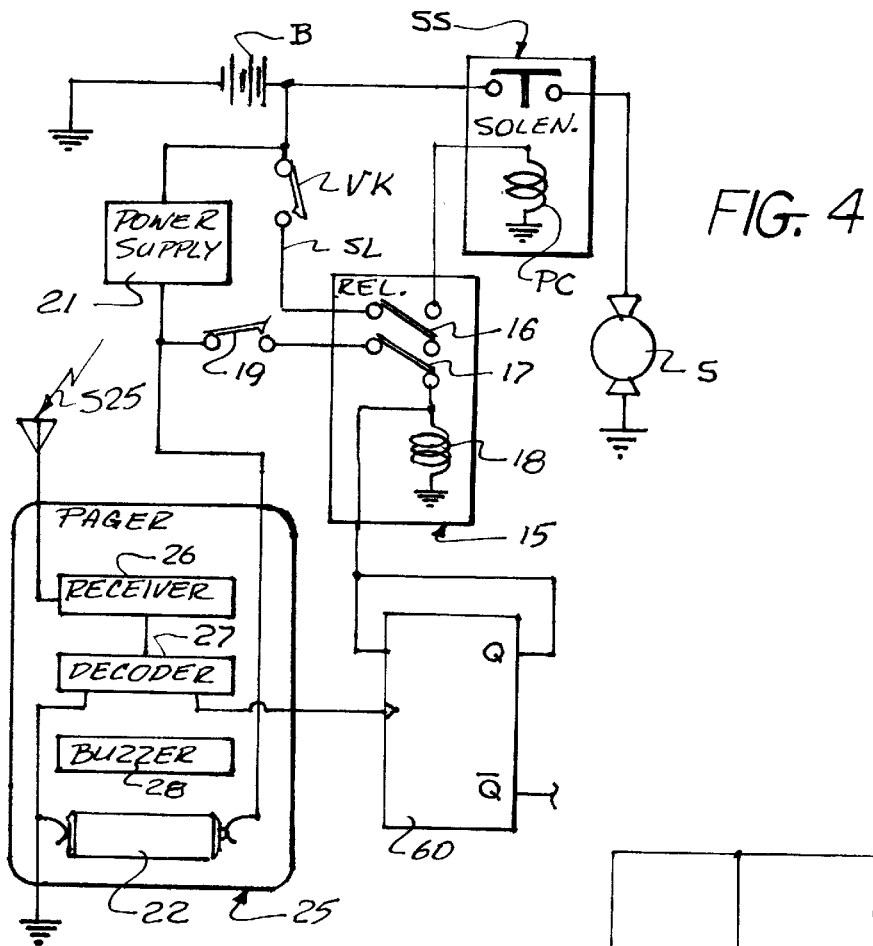
FIG. 4 is a further diagrammatic illustration exemplifying yet another variation of the of the inventive system.

As illustrated in FIG. 4, like numbered parts functioning in like manner, a flip-flop 60 may be inserted in the circuit between decoder 27 and the coil 18, conformed in a toggle connection. Thus the first pager signal latches relay 15, which is then unlatched by the second pager phone call. This interconnection may be in parallel with switch 19, or may supplant its function.

It should be noted that pager 25 exemplifies well known electrical functions, which recently have been expanded to include transmission of code once communication has been established. This general character of the device, therefore, is now more in the nature of a radio frequency data link where various data combinations can be decoded once received. In this more general form discrete code sequences can be transmitted, one to disable the motor vehicle in the manner described above, and the second to reset its operation once the user complies with the desired return phone call or other response. This function of a data ling is illustrated in FIG. 5 wherein like numbered parts operate in a like manner to that previously set out.

Figure 5:
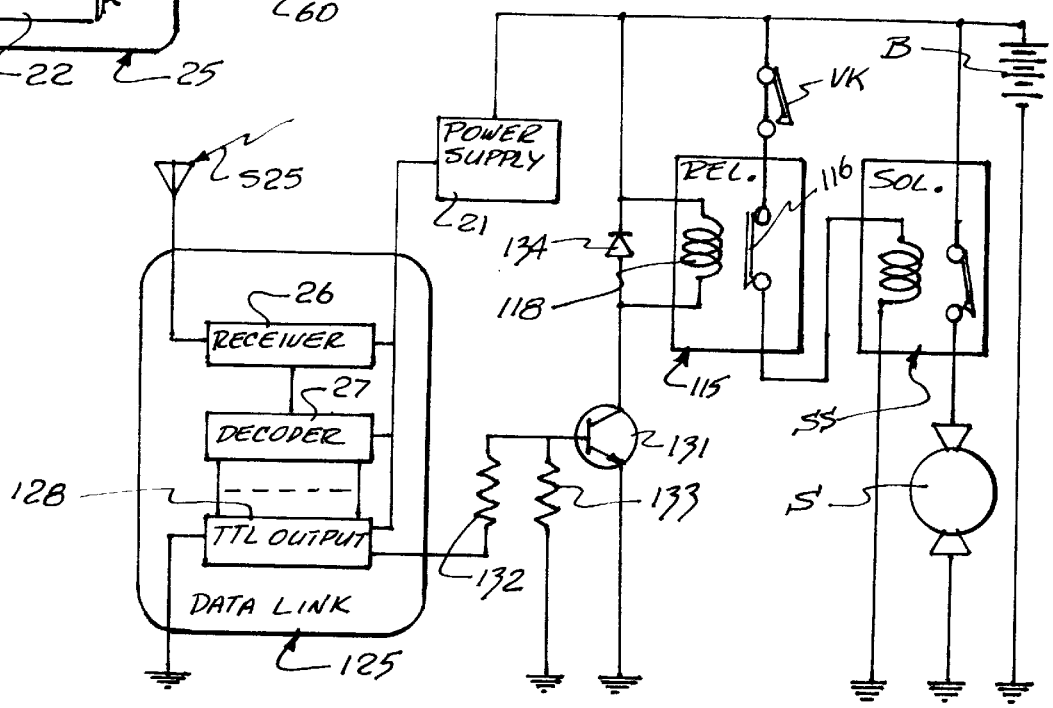
FIG. 5 is a diagrammatic illustration of a further alternative of the inventive system conformed to operate in response to radio frquency transmitted data combinations.

As illustrated in FIG. 5, a data link assembly 125 includes the receiver stage 26, and the decoder 27, decoding the data sequence impressed on the radio signal S25. If the code combination received correctly combines to the disabling code, a TTL stage 128 produces the desired output DO that then drives the base of a transistor 131 through a voltage division determined by resistors 132 and 133. Thus the transistor 131, connected in an emitter-follower circuit, is then driven to conduct an opposed bias diode 134 that at its other side connects to battery B.

The potential across diode 134 then excites a relay coil 118 of a relay 115, pulling open a normally closed contact 116 in circuit between the ignition signal SL and the solenoid winding PC. The starting sequence to the starter S is thus disabled.

One will note that this last implementation includes a direct connection between the power supply 21 and the data link assembly 125. Thus once the disabling code combination is received, it remains latched in the decoder 27 until a different code sequence is transmitted on signal S25. This required second code sequence can therefore be issued remotely, without the need for local manipulation of hidden reset switches like switch 19 described above. This last example, therefore, allows for a wholly localised central control over the disablement and the subsequent enablement of the vehicle.

Obviously, many variations and modifications may be made to the foregoing teachings without departing from the spirit of the present invention. It is therefore intended that the scope of the instant invention be determined solely by the claims appended hereto.

I claim:

1. In a motor vehicle characterized by a power plant, means for transferring motive power from said power plant to the undercarriage of said vehicle, a starter connected to said power plant for starting the operation thereof, a battery for storing an electrical charge, a solenoid selectively connecting said battery to said starter, and a manually operative ignition circuit for selectively operating said solenoid, the improvement comprising:

a pager connected for electrical excitation to said battery including a receiver conformed to receive electromagnetic signals of a preselected signal combination and output means for generating an audio signal in response to the receipt of said signal combination;

a latching relay connected in said ignition circuit and to said output means for opening said ignition circuit upon the receipt of said signal combination; and restoration means connected to said latching relay for closing said ignition circuit upon the manual articulation thereof.

2. Apparatus according to claim 1, further comprising:

a power supply connected between said battery and said said pager, for converting the electrical power output from said battery to the power levels of said pager.

3. Apparatus according to claim 2, wherein:

said restoration means includes a switch connected in circuit between said battery and said latching relay.

4. Apparatus according to claim 3, wherein:

said switch is a push-to-close momentary contact switch.

5. Apparatus according to claim 1, wherein:

said restoration means includes a switch connected in circuit between said battery and said latching relay.

6. Apparatus according to claim 5, wherein:

said switch is a push-to-close momentary contact switch.

7. Apparatus according to claim 6, wherein:

said switch is mounted in said vehicle in concealed placement.

8. A method for remotely disabling the starting sequence of a motor vehicle, comprising the steps of:

installing a pager in said vehicle in circuit with the ignition signal effecting said starting sequence;

placing a telephone call to the telephone facility of the vehicle user; and transmitting a coded electromagnetic signal to said pager to effect a latched opening of said ignition signal upon the receipt of a negative response to said placement of said telephone call.

9. A method according to claim 8, comprising the further step of:

providing a secondary signal to unlatch and close said ignition signal.

10. A method according to claim 9, wherein:

said step of installing a pager includes the further step of connecting a latching relay in said ignition signal.

11. A method according to claim 10, comprising the further step of:

providing a secondary signal to said latching relay to unlatch and close said ignition signal.

12. In a motor vehicle characterized by a power plant, means for transferring motive power from said power plant to the undercarriage of said vehicle, a starter connected to said power plant for starting the operation thereof, a battery for storing an electrical charge, a solenoid selectively connecting said battery to said starter, and a manually operative ignition circuit for selectively operating said solenoid, the improvement comprising:

a pager connected for electrical excitation to said battery including a receiver conformed to receive electromagnetic signals of a preselected signal combination and output means for generating an audio signal in response to the receipt of said signal combination;

a latching relay connected in said ignition circuit and to said output means for opening said ignition circuit upon the receipt of said signal combination; and restoration means connected to said latching relay for closing said ignition circuit upon the receipt of a successive electromagnetic signal.

* * * * *